Aug. 19, 1941.                W. RICHTER                 2,253,307
                         ELECTRICAL CIRCUIT
                         Filed Feb. 18, 1938
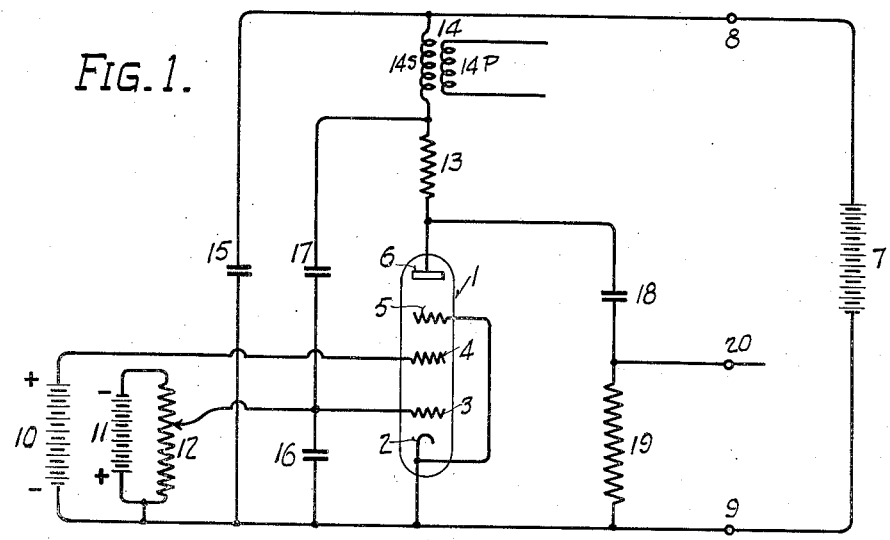
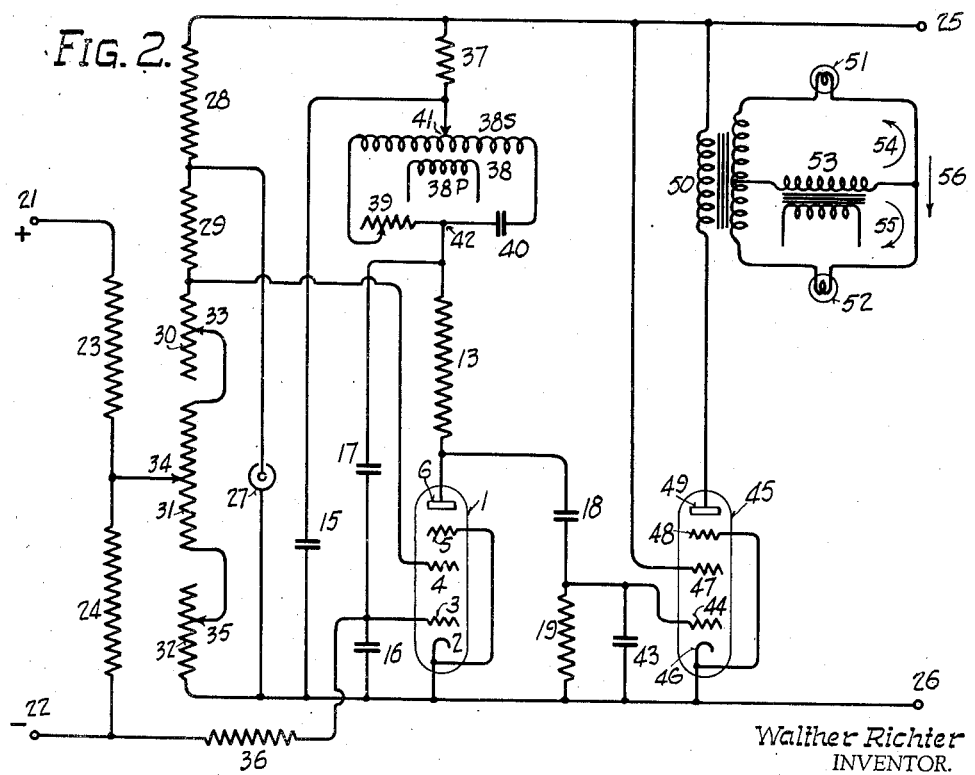
Walther Richter
INVENTOR.
BY *Erwin C. Andrus*
ATTORNEY.

Patented Aug. 19, 1941

2,253,307

UNITED STATES PATENT OFFICE 2,253,307

ELECTRICAL CIRCUIT

Walther Richter, Wauwatosa, Wis., assignor to A. O. Smith Corporation, Milwaukee, Wis., a corporation of New York Application February 18, 1938, Serial No. 191,199

2 Claims. (Cl. 250—27)

This invention relates to an electrical circuit for producing an alternating voltage which changes in magnitude and phase in response to variations in a unidirectional voltage.

An alternating voltage which can be changed in absolute magnitude and also reversed in phase is frequently desirable for controlling the operation of thyratrons or other gaseous discharge tubes. The circuit of this invention provides means for producing such changes in alternating voltage in response to variations in a unidirectional voltage and can be used, therefore, as a link between a variable unidirectional voltage and thyratrons or other gaseous discharge tubes which it is desired to control in accordance with variations in this voltage.

One of the objects of the invention is to provide an electrical circuit capable of use as a link of the kind just described.

Another object of the invention is to provide an improved circuit for use in voltage indicators such as are described in my prior Patents Numbers 2,045,800 and 2,045,801.

Other objects of the invention will be clear from the accompanying description and the drawing in which:

Figure 1 is a diagram of one embodiment of the invention; and

Fig. 2 is a diagram of a voltage indicator which includes a somewhat different embodiment of the invention.

Referring to the drawing and in particular to Fig. 1, it will be seen that the circuit comprises an electron tube 1. Different types of tube may be used in the circuit. One type which has proved suitable and which is illustrated in the diagram is a 6J7, with cathode 2, control grid 3, screen grid 4, suppressor grid 5, and plate 6. The heater connections for the cathode are not shown in the drawing as they are well known to the art and form no part of this invention. Plate voltage for the tube is supplied by a battery 7 connected across points 8 and 9. Constant voltage for the screen grid 4 is supplied by battery 10. A variable unidirectional voltage for application to the control grid 3 is supplied by battery 11 and voltage divider 12. It is to be understood that the diagram in Fig. 1 is for the purpose of illustrating how the invention operates and that in an actual installation the voltages for application to the plate and screen grid of the tube may be supplied by a suitable rectifier instead of by batteries while the variable unidirectional voltage for application to the control grid will be taken from some electrical device in which changes in operation give rise to changes in the voltage across the device.

The plate circuit of the tube 1 contains a resistor 13 and the secondary 14S of a transformer 14 of which the primary 14P is fed with alternating current. This may conveniently be 60 cycle current taken directly from the 110 volt lines. Condensers 15, 16, and 17 couple the secondary 14S of transformer 14 to the control grid 3 of tube 1 and apply to this grid a fraction of the voltage induced in the secondary of the transformer. Condenser 18 and resistor 19 are connected across the tube as shown.

Points 9 and 20 at opposite ends of resistor 19 are the output terminals for the circuit shown in Fig. 1 and may be connected to another amplifying tube (not shown in Fig. 1) for amplifying the voltage drop across resistor 19 if necessary and is available for the operation of suitable indicating or control devices. Since the grid current to an amplifying tube can be made very small under proper conditions it will be seen that substantially no current will be drawn from points 9 and 20 by the tube which is to be connected between them.

With this circuit the alternating voltage induced in the secondary of transformer 14 operates in two different ways to produce an alternating voltage between points 9 and 20. Assume for the moment that the setting on voltage divider 12 is such as to put a strongly negative bias on control grid 3. This will keep tube 1 from amplifying the alternating voltage which the secondary of transformer 14 applies to its grid over the voltage divider formed by condensers 16 and 17. Since screen grid tubes such as a 6J7 have an extremely high plate resistance substantially no alternating current will flow through the tube 1 when there is no amplification of the alternating voltage applied to its grid. The alternating voltage induced in the secondary of transformer 14 will operate through resistor 13, condenser 18, resistor 19 and back to transformer 14 over condenser 15 or battery 7 to set up an alternating voltage across resistor 19. When the lower end of the secondary 14S of transformer 14 is positive with respect to the upper end, point 20 will be positive with respect to point 9. Hence, when there is no amplification produced by tube 1 the phase of point 20 is the same as that of the lower end of the secondary 14S of transformer 14. Furthermore, under these conditions the voltage between points 9 and 20 has its maximum value in this direction since an increase in the negative grid bias applied to tube 1 can cause no further decrease in amplification while a change of the grid bias to a more positive value will, as shown below, first cause the alternating voltage between 9 and 20 to decrease in magnitude and finally reverse in direction.

The way in which this change is produced is as follows: Suppose that the grid bias on control grid 3 of tube 1 is adjusted to such a value as to cause amplification of the alternating voltage across condenser 16 which is applied to the grid from the secondary of transformer 14. When the lower end of the secondary winding of transformer 14 is positive a positive potential is applied to the control grid 3. This causes an increased flow of electrons from the cathode 2 to the plate 6 of tube 1 and consequently results in decreasing the positive potential of the plate. This decrease in potential counteracts in part the increase in potential that is produced by the direct effect of the secondary winding on resistor 13, and as a consequence the alternating potential between points 9 and 20 is decreased in magnitude. It will be seen, therefore, that the potential at the lower end of resistor 13 is determined by the difference of two alternating voltages produced by the secondary of transformer 14, (1) an alternating voltage produced by virtue of the direct connection between resistor 13 and the secondary of the transformer, and (2) an inverse voltage produced because of the amplification of the alternating voltage which the secondary of transformer 14 applies to the grid of tube 1. The first of these produces at the lower end of resistor 13 an alternating potential which has the same phase as the potential of the lower end of secondary 14S; the second a potential which is of opposite phase. The first is of constant magnitude, so long as the circuit constants and the primary voltage on transformers 14 are not changed; the second is of a magnitude which depends upon the extent to which the tube 1 amplifies the alternating voltage applied to its grid by transformer 14. For many applications it is convenient to give the circuit values which will permit the second alternating voltage to be varied over a range of magnitude extending from zero to approximately twice the magnitude of the first alternating voltage. When this is done the resultant of the two voltages is capable of variation from a certain value in one phase to a substantially equal value in the opposite phase.

The magnitude of the second alternating voltage and consequently the magnitude and direction of the resultant of the first and second alternating voltages, are controlled by the grid bias applied to tube 1. When an amplifier tube is operated on the curved portion of its grid-voltage-plate current curve the amount of amplification of an alternating voltage applied to the grid depends upon the grid bias. For a sufficiently large negative bias the amplification is substantially zero. As the bias is made more positive the amplification becomes progressively greater due to the increased slope of the curve showing the relation between grid voltage and plate current. In the arrangement shown in Fig. 1 the secondary of the transformer 14 applies an alternating voltage of constant magnitude to the control grid 3. A change of grid bias from negative towards positive values results in increased amplification of this voltage and consequently produces a second alternating voltage of increased magnitude. Hence with the arrangement shown, the alternating voltage that is produced across points 9 and 20 when there is a strong negative bias on the grid of tube 1, is first reduced in absolute magnitude as the grid bias is made more positive, and is later reversed in direction for still more positive grid bias and built up in the opposite direction.

The illustration in Fig. 1 shows the variable unidirectional grid bias applied by means of a battery and voltage divider 12 but it is apparent that the grid bias might equally well be taken from a piece of electrical equipment across which the unidirectional voltage varies due to differences in operating conditions. These variations in voltage then operate to set up the alternating voltage across points 9 and 20 which can be readily amplified and fed into indicating or controlling devices. The alternating voltage produced by this circuit can be used to control the operation of thyratrons or other gaseous discharge tubes and the invention therefore provides a means of controlling these in response to variations in a unidirectional voltage.

Fig. 2 shows a slightly modified embodiment of the invention used in a device which employs two signal lamps to give a visual indication of voltage variations. This voltage indicator may be used, for example, to measure the voltage across a D. C. arc for electric arc welding and to furnish the operator with a visual indication of whether his arc voltage exceeds or falls below a desired value.

Referring to Fig. 2 the arc voltage is applied to terminals 21 and 22. Resistors 23 and 24 divide this voltage so as to give a suitable fraction for use in the rest of the device.

Plate voltage for the electron tubes used in this circuit is supplied by a suitable rectifier (not shown in the drawing) which is connected to terminals 25 and 26. A voltage regulator tube 27 and resistor 28 are connected in series across the plate supply. Variations in the plate voltage are absorbed in the resistor 28. The voltage regulator tube 27 maintains a constant voltage across its terminals. Resistors 29, 30, 31 and 32 divide out a suitable fraction of this constant voltage for application to screen grid 4 of tube 1. Adjustment of sliders 33, 34, and 35 on resistors 30, 31 and 32 permits the selection of another fraction of the constant voltage across tube 27 for combination with the voltage drop produced across resistor 24 by the arc voltage. The combined voltage is applied to control grid 3 of tube 1 through resistor 36.

The values of condenser 16 and the resistors should be such as to produce a time lag across the condenser and damp out the effect of rapid fluctuations in arc voltage. It is preferable to have a time constant of from 1 to 2 seconds for the circuit which impresses the arc voltage upon control grid 3. This results in making the indicating device responsive to the average arc voltage but insensitive to extremely rapid variations.

Resistor 37 and capacity 15 serve to filter the plate voltage applied to tube 1 in addition to whatever filtering there is provided in the rectifier.

In the embodiment of the invention shown in Fig. 2 the simple transformer 14 of Fig. 1 is replaced by transformer 38 with primary 38P and center tapped secondary 38S connected across resistor 39 and condenser 40. Since the voltages across the resistor 39 and condenser 40 are 90° out of phase with each other, changing the value of resistor 39 will change the phase of the voltage picked up between points 41 and 42. The reason for providing this adjustment will be made clear later.

The alternating voltage set up across resistor 19 is applied to control grid 44 of tube 45. Condenser 43, which is very small, serves to prevent unwanted oscillations due to feed back. Tube 45 may desirably be a 6F6 with cathode 46, screen grid 47, suppressor grid 48 and plate 49. Tube 45 is to be understood to be employed with usual means for establishing proper grid bias. The plate current from this tube passes through the primary of a transformer 50 of which the center tapped secondary forms a part of a bridge circuit including two lamps 51 and 52 and a transformer 53. The primary of transformer 53 is fed from a suitable source of constant A. C. such as a 110 volt line.

Assume for the moment that there is no A. C. component flowing in the primary of transformer 50. The secondary current from transformer 53 will split equally and flow through lamps 51 and 52 in the directions indicated by arrows 54 and 55 for one half cycle. The voltage produced by transformer 53 should be such that the lamps 51 and 52 are just on the point of glowing when no alternating current flows through the primary of transformer 50. If now an alternating current flows through the primary of transformer 50 to produce a secondary current in the direction indicated by arrow 56, the current through lamp 51 will be diminished and that through lamp 52 will be increased. Consequently lamp 52 will begin to glow and will glow with increasing brightness as the current through the primary of transformer 50 increases. A reversal of the direction of the current through transformer 50 will cause lamp 51 to glow while lamp 52 remains dim. To obtain this result with the greatest effectiveness the current sent through the lamps 51 and 52 by transformer 50 should be exactly in phase or 180° out of phase with the current produced by transformer 53. This adjustment is made by choosing proper values for resistor 39 and condenser 40 in the plate circuit of tube 1.

For use in indicating when a desired arc voltage is being maintained, slider 34 is adjusted so that no alternating current is sent through the primary of transformer 50 so long as the arc voltage is at the desired value. Under these conditions there is no glow in either of the signal lamps 51 and 52. When the arc voltage sinks below the desired value an alternating current in one direction is sent through transformer 50 and causes one of the lights to glow; when it rises above, the other lamp is lit. The magnitude of the deviation from the desired value is indicated by the brilliancy with which the lamp glows. In this way the operator is kept continuously informed as to the voltage across his arc.

In case it is desired to use the apparatus for indicating the voltage across an A. C. arc, the alternating arc voltage will first be rectified, and the rectified voltage applied to terminals 21 and 22 of Fig. 2.

I claim:

1. A device for producing an alternating voltage which varies in magnitude and reverses in phase in response to variations in a unidirectional bias voltage comprising a vacuum tube with at least three elements, a cathode, a grid, and a plate; means for applying the unidirectional bias voltage to the grid of said tube; a source of alternating potential in the plate circuit of said tube; means distinct from the inter-electrode capacities of the tube for applying alternating potential from said source to the grid of the tube; and means for combining the alternating voltage produced by amplification of the voltage applied to the grid of the tube and another alternating voltage derived from the source of alternating potential so as to produce a resultant alternating voltage which varies in magnitude and direction in accordance with changes in the bias voltage.

2. A device for producing an alternating voltage which varies in magnitude and reverses in phase in response to variations in a unidirectional bias voltage comprising a vacuum tube with at least three elements, a cathode, a grid, and a plate; a source of alternating potential in the plate circuit of the tube; a reactance between the plate and the source of alternating potential; means distinct from the inter-electrode capacities of the tube for applying an alternating potential from said source to the grid of the tube; and a circuit extending from a point between the reactance and plate to take off an alternating potential which varies in magnitude and phase in accordance with variations in the amplification factor of the tube caused by changes in the unidirectional bias applied to its grid.

WALTHER RICHTER.